Jan. 16, 1962  W. A. MENZEL  3,016,736
DAMPING COEFFICIENT MEASURING INSTRUMENT
Filed April 9, 1959  2 Sheets-Sheet 1
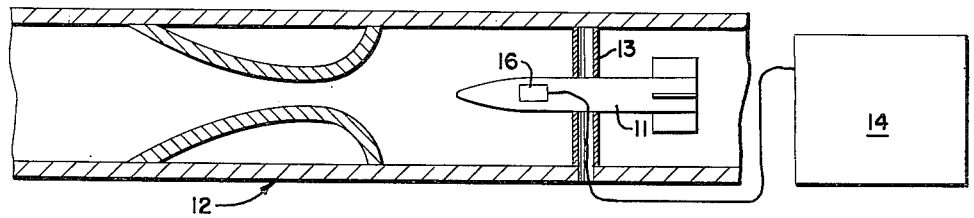
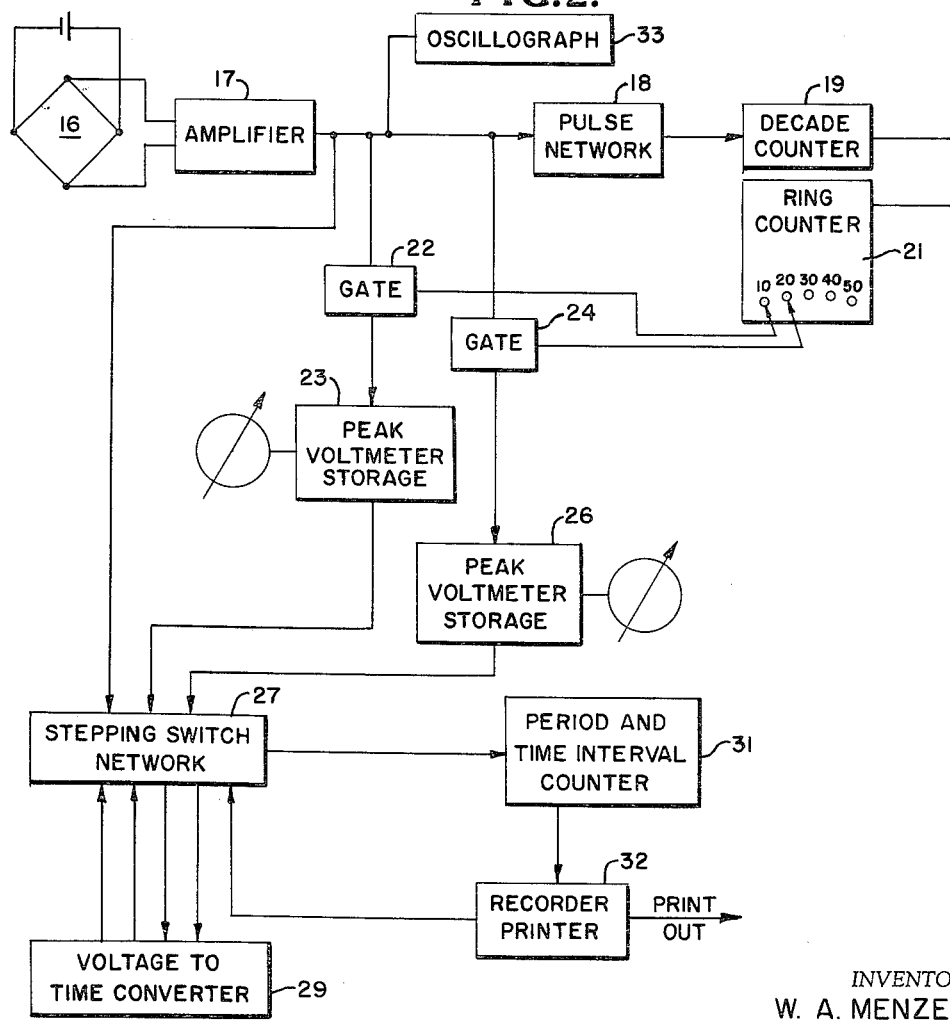
INVENTOR,
W. A. MENZEL
ATTORNEYS.

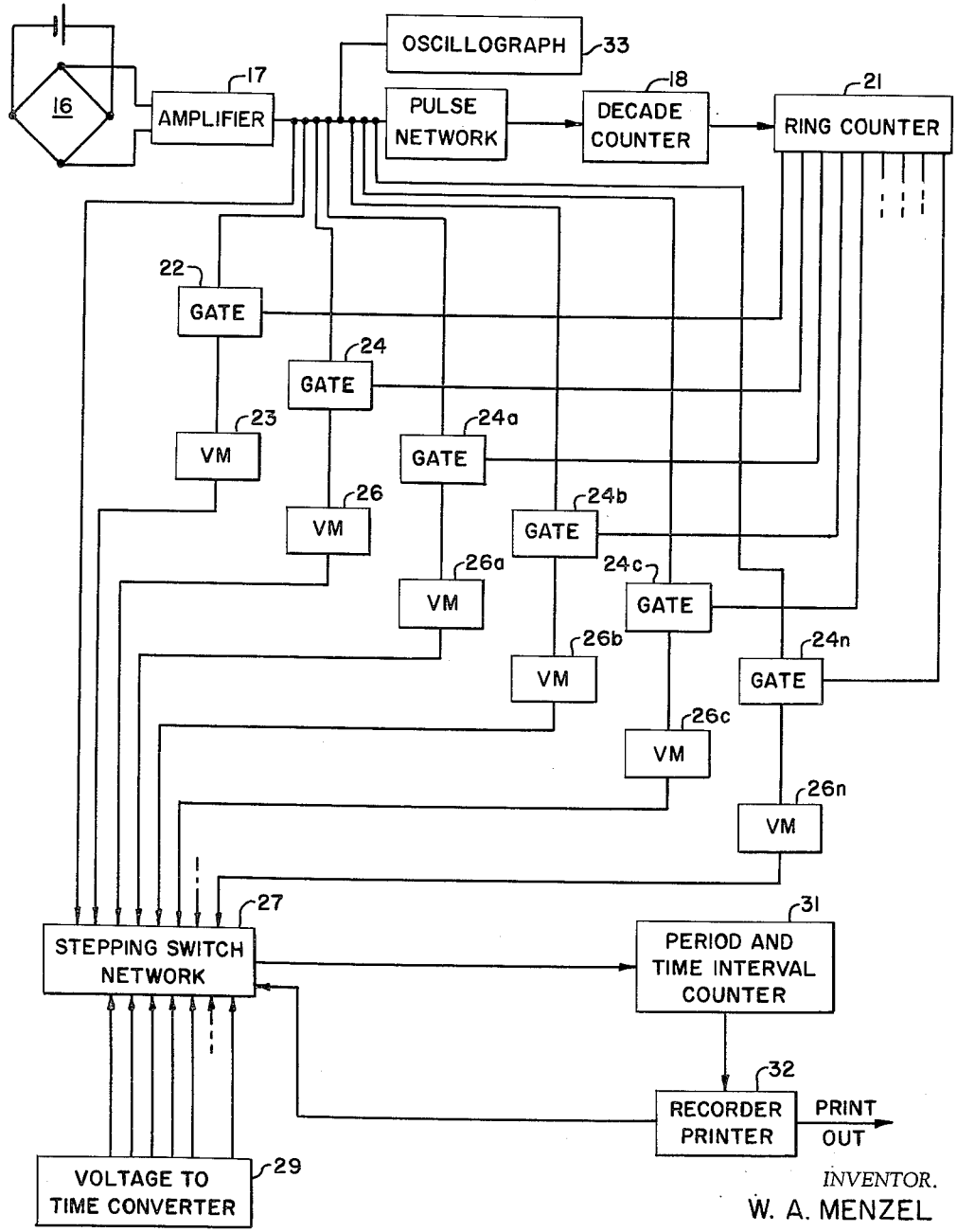

United States Patent Office 3,016,736
Patented Jan. 16, 1962

3,016,736
DAMPING COEFFICIENT MEASURING INSTRUMENT
Wolfgang A. Menzel, Silver Spring, Md., assignor to the United States of America as represented by the Secretary of the Navy
Filed Apr. 9, 1959, Ser. No. 805,349
4 Claims. (Cl. 73—71.4)
(Granted under Title 35, U.S. Code (1952), sec. 266)

The invention described herein may be manufactured and used by or for the Government of the United States of America for governmental purposes without the payment of any royalties thereon or therefor.

This invention relates generally to an improved electronic instrument for measuring the damping coefficient of a body undergoing oscillatory motion and is concerned in particular with apparatus for measuring the damping coefficient of a wind tunnel test model.

The behavior of aerodynamic bodies at high speeds is studied by testing the performance of scale models in wind tunnels. The dynamic behavior of an aerodynamic body may be tested in a wind tunnel by a variety of methods. For example, one way of measuring the damping coefficient for a model which is oscillating under actual flow conditions in the tunnel is to utilize a high speed camera to produce a record of the position of the model plotted against time. From this, the information necessary for determining the damping coefficient can be evaluated. One disadvantage of this method is that it is rather time consuming since the developed film has to be viewed with a film reader and the value of the angular position of the model must be plotted against time to determine frequency and the damping factor of the oscillatory motion. Results are not readily available immediately following the test. To reduce the time required to determine the damping coefficient, this invention provides instantaneous reduction of data to printed form from which the value of the damping coefficient may be easily computed.

Accordingly, it is one object of this invention to provide apparatus for use in evaluating the characteristics of a body in oscillatory motion.

Another object of this invention is to provide a new and novel instrument for aiding in the measuring of the damping coefficient of an aerodynamic model undergoing oscillatory motion in a wind tunnel.

These and many other objects will become more readily apparent when the following specification is read and considered along with the attendant drawings wherein like numerals designate like or similar parts throughout the various views and in which:

FIG. 1 is a view, in section, of a wind tunnel containing a model which is being tested;

FIG. 2 is a block diagram of a simplified form of this invention; and

FIG. 3 is a block diagram of an instrument embodying the principles of this invention and constructed to give more complete results than the embodiment shown in FIG. 2.

Basically, this invention is directed to apparatus for measuring the peak amplitude of an electrical signal at selected intervals and to record this data after optionally transforming it with a time base converter into equivalent time intervals, which intervals are measured and displayed by an electronic period and time interval counter. This counter is also used to measure the period of oscillation of the model or other object undergoing tests. A recording device yields a printed record of these measurements in digital form.

Referring now with greater particularity to FIG. 1, a model 11 is disposed within wind tunnel 12 and may be rotatably mounted on a suitable hollow strut 13 at its center of gravity and allowed to oscillate freely during the test. The strut 13 is secured at either side of the wind tunnel. Electrical leads are brought out through the hollow strut to the electronic instruments shown generally at 14. A transducer 16 such, for example, as a strain gage bridge, differential transformer, accelerometer, or the like, is located in the oscillating model 11 and transforms the mechanical motion (velocity or acceleration) of the model as it oscillates about strut 13 into an analog voltage signal.

As indicated in FIG. 2, the generally sinusoidal output from transducer 16 is fed into amplifier 17. Oscillograph 33 may be employed to record the oscillatory motion. After amplification, the sinusoidal signal is introduced into a pulse forming network 18 which may conveniently consist of a squaring circuit and a differentiating network to produce short duration pulses which trigger a counter 19. It is to be understood that counter 19 may be set to count at the reception of successive multiples of any given number of input pulses for example 5, 10, 15, 20, etc.; but it is convenient to use a conventional decade counter to produce an output pulse at every tenth input signal received from pulsing network 18. The output from counter 19 is fed into a ring counter 21 which has a plurality of outputs labeled in the drawings as 10, 20, 30, 40 and 50. A pair of gates indicated at 22 and 24 are connected to the output of counter 21 so that they receive the 10th and 20th, 20th and 30th, 30th and 40th, or 40th and 50th, etc. pulses from counter 21. However, it should be noted that the triggers to gates 22 and 24 are in this embodiment, adjusted manually so that at any given time there can be no more than one selected trigger to each gate. In other words, before a test run starts, the operator must select a 10–20 or 40–50 input, for example, to these gates. Upon the receipt of the first pulse from the decade counter 19, the ring counter 21 generates a trigger signal which opens gate 22. Gate 22 is connected between amplifier 17 and a peak reading voltmeter 23 in such a manner as to normally block the input to the voltmeter 23. Voltmeter 23 contains a memory circuit (not shown) which stores the peak value of received voltage. Upon receipt of a trigger signal from the ring counter 21, gate 22 becomes unblocked thereby permitting the amplified sinusoidal voltage to be impressed upon voltmeter 23. The voltmeter reads and stores the peak value of the sinusoidal wave. Since the oscillations of the model 11 are being damped, the first voltage peak received by voltmeter 23 will be greater than all succeeding peaks; accordingly, the peak recorded will be the first peak received by voltmeter 23.

In like manner, gate 24 which is connected to the output of amplifier 17 and peak reading voltmeter 26 is unblocked by the second trigger from ring counter 21 (10 cycles behind the trigger unblocking gate 22). The ratio of the peak voltages must be determined to calculate the damping coefficient. This may be done by noting the voltage recorded by voltmeters 23 and 26, and performing the simple arithmetic division. However, this method of determining the damping coefficient is subject to human errors involved in reading voltmeters 23 and 26.

Preferably the peak recorded voltage from peak reading voltmeter 23 and peak reading voltmeter 26 as well as the initial output from amplifier 17 are introduced into a stepping switch network 27. The three signals are applied in sequence to the stepping switch network 27. At first switch 27 connects the initial signal from amplifier 17 directly to a counter 31. This makes it possible to determine the period of oscillation ($\Delta t$) simply by measuring the period between successive cycles of the amplified signal. When gate 22 is unblocked, the converter 29, input and output, are switched to the output of the peak reading voltmeter 23 by switch 27 to convert the value of the peak voltage into a time interval, which is measured by counter 31 which reduces the time interval corresponding to the peak voltage to a digital form from its voltage analog form. The length of the period in digital form is then applied to a recorder printer 32 which prints out this value and at the same time applies a signal to the network 27 so that it steps again to advance to the next position to receive and transfer the peak voltage of the second voltmeter 26 to the voltage-to-time converter 29 for transfer and read out of voltmeter 26.

A convenient method of effecting the voltage to time conversion is to produce an internal sawtooth voltage at converter 29 as, for example, by use of an amplifier, squaring and pulse amplifier, and a phantastron circuit with a cathode follower output which may operate with a 60 cycle repetition frequency. When the rising sawtooth generated within converter 29 equals the inputs from voltmeters 23 or 26, the converter generates a pulse. The pulses are supplied through stepping switch network 27 to the counter 31 where the time required for the rising sawtooth to equal each D.C. voltage is measured. The stepping switch network is actuated in a predetermined sequence by recorder 32 in the manner hereinabove described. At first the stepping switch connects the original amplified signal to counter 31 to give the period of oscillation. It then switches the time converter input and output to the first voltmeter 23 to transfer its value into the time interval (rise time of the sawtooth) which is measured by the counter 31. The data recorder, combined with the counter, gives a printed record of the data and also gives at the end of each print a signal to the stepping switch to advance the next position for transfer and readout of the voltmeter 26 in the manner described above.

To arrive at the damping coefficient, the following formula is employed:

$$D = ln\frac{\frac{A1}{A2}}{x[\Delta t]}$$

where $D$ = the damping coefficient;

A1 and A2 are the amplitudes of oscillation at selected recurring pulses;

$\Delta t$ is the period of oscillation and is measured as by the time between successive voltage peaks of the signal from amplifier 17 applied directly to counter 31.

$\Delta t$ must be multiplied by $x$, the number of cycles of oscillation which occurs between the first and second amplitudes recorded. Thus, for example, if A1 is to be the 40th cycle and A2 is the 50th cycle, $\Delta t$ must be multiplied by 10.

When only two gating circuits are employed, it is only possible to determine the damping coefficient between two selected cycles. In the event that nonlinearity in the oscillator motions develops, it is necessary to completely evaluate the entire damped oscillation. While the embodiment shown in FIG. 2 satisfactorily performs the necessary functions for plotting the values of the damping coefficient of the decaying oscillation of the body 11, it may be further improved by adding a plurality of gates which are fed to a stepping switch network 27 as shown in FIG. 3, thus making it unnecessary to manually switch the output from ring counter 21 every time it is desired to read successive pulses of the counter 19. This makes it a great deal more efficient in a wind tunnel since it is not necessary to make more than one test run per model. The circuit shown in FIG. 3 makes it possible to obtain data which can be combined to show any change in the damping coefficient due to nonlinear behavior of the model as the oscillation damps out. This nonlinearity could be introduced, for example, by turbulence of the air flowing past the model which would introduce perturbations in the sinusoidal shape of the characteristic decay curve of the oscillations. Moreover, when the arrangement shown in FIG. 3 is employed, it is necessary only to make one run in the wind tunnel whereas in the embodiment shown in FIG. 2, a series of runs would be necessary to be certain of the shape of the decay curve plotted on semi-logarithmic paper. If the curve were not a straight line, the value of D derived from Equation 1 would not be valid throughout the entire time of oscillation.

The apparatus of FIG. 3 is similar to that of FIG. 2 except for the added gates (24a), (24b), (24c) and (24n) and voltmeters (26a), (26b), (26c) and (26n). For that reason, the apparatus of FIG. 3 will not be described in detail. However, it should be pointed out that $\Delta t$ may be measured once as is done in the apparatus of FIG. 2 or it may be measured after each pair of signals representative of the appropriate peak voltages is received.

In both of the embodiments shown, the peak amplitudes were first converted into equivalent time intervals prior to recordation. It is to be understood that while this is very convenient it is not absolutely essential, for example, the readings of the peak voltmeter may be observed and recorded by the operator and the ratio of A1 and A2, etc. may be figured as voltages rather than as time without necessitating any change in the dimension of D or $\Delta t$.

The components used in practicing the invention are all readily available from commercial suppliers. Many of the components may be procured as "building block" plug-in circuits and assembled to form the required components.

It should be clear to those skilled in this art that this invention provides a novel circuit which is useful in evaluating the characteristics of an oscillatory motion, and that the specific embodiments are described herein for the purpose of illustration only. Accordingly, this invention is not to be construed as limited by the aforedescribed specific embodiments and is to be defined only by the scope of the appended claims.

What is claimed as new and desired to be secured by Letters Patent of the United States is:

1. Apparatus for use in determining the damping coefficient of the periodic movement of a body which comprises; a transducer connected to said body for providing a periodic electrical signal correlative to the movement of the body, a plurality of normally closed gating circuits connected to the output of said transducer to receive the electrical signal, means connected to the output of said transducer to receive said electrical signal and coupled to said gating circuits to sequentially open the gating circuits at predetermined cycles of the electrical signal, a plurality of peak measuring voltmeters each connected to a respective gating circuit for receiving and storing the peak voltages impressed upon the respective gates, a converter for converting the peak voltages to corresponding time intervals, a stepping switch coupled to receive the periodic electrical signal and the peak voltage from each of said voltmeters for sequentially applying the peak voltages to the converter whereby said converter produces a plurality of pairs of pulses spaced apart at time intervals correlative respectively to values of the peak voltages received by said converter, means coupled to said stepping switch for recording the period of oscillation of the electrical signal and the time intervals indicative of the values of the corresponding peak voltages for sequentially operating said stepping switch.

2. A system for use in determining the damping coefficient of an oscillating body including in combination; means for providing a periodic electrical signal correlative to the movement of the body, means electrically coupled to said first means for measuring the period of said electrical signal, a plurality of normally closed gating circuits connected to receive the electrical signal, means coupled to said first means to receive the electrical signal and connected to the gating circuits to open respective gating circuits sequentially at predetermined spaced apart cycles of the electrical signal, a plurality of peak voltage measuring means each connected to the output of a respective gating circuit for individually measuring the peak voltage received through each gating circuit as the gating circuit opens, switching means for sequentially coupling each of said peak voltage measuring means to a recording means whereby the maximum values of the peak voltages at known cycles of the electrical signal may be compared and the damping coefficient of the oscillating body may be determined.

3. Apparatus for use in determining the damping coefficient of an oscillating body which comprises; a transducer connected to said body for providing a cyclically recurring electrical signal correlative to a particular motion of the body, a plurality of normally closed gating circuits having inputs connected to receive said electrical signal, a decade counter receiving said signal, said counter being coupled to a ring counter having a plurality of outputs each connected to a respective gating circuit whereby said gating circuits are opened each at a predetermined cycle of the electrical signal, a plurality of peak-storing voltmeters each connected to a respective gating circuit for storing the peak voltage received, a voltage-to-time converter, a stepping switch coupled to said voltmeters and to said converter for sequentially coupling said converter to said voltmeters in succession for converting the peak voltage stored by each voltmeter into a corresponding time interval, means coupled to said stepping switch for receiving the electrical signal and the output of said converter for reducing the time period of the electrical signal and the time intervals to digital form, a recorder coupled to said signal receiving means for recording the output thereof and connected to said stepping switch for advancing said switch when the output of said means is recorded.

4. Apparatus for determining the damping coefficient of an oscillating body comprising; a transducer connected to said body for providing a cyclically recurring electrical signal having a characteristic period of oscillation, a plurality of normally closed gating circuits having inputs connected to receive the electrical signal, counting means having an input coupled to receive the electrical signal, said means having a plurality of outputs each connected to a respective gating circuit to open said gating circuits each at a predetermined cycle of the electrical signal, a plurality of peak-storing voltmeters each connected to a respective gating circuit for storing the peak voltage received, a stepping switch connected to said voltmeters and to the output of said transducer, voltage-to-time converter means connected to said stepping switch, said stepping switch sequentially coupling said converter means to the output of said transducer and to the output of each of said voltmeters in succession to convert the characteristic period of oscillation of the electrical signal and the peak voltage stored by each voltmeter into digital form, and a recorder coupled to said converter for recording the output thereof.

References Cited in the file of this patent
FOREIGN PATENTS
774,376    Great Britain _____ May 8, 1957